United States Patent [19]

Safonov

[11] Patent Number: 5,758,163
[45] Date of Patent: May 26, 1998

[54] METHOD AND APPARATUS FOR RECORD FIELDS USAGE CHECKING AT COMPILE TIME

[75] Inventor: Vladimir Olegovich Safonov, St. Petersburg, Russian Federation

[73] Assignee: Sun Microsystems, Inc., Palo Alto, Calif.

[21] Appl. No.: 585,815

[22] Filed: Jan. 16, 1996

[30] Foreign Application Priority Data

Oct. 24, 1995 [RU] Russian Federation ............ 95118820

[51] Int. Cl.$^6$ .................................................. G06F 9/45
[52] U.S. Cl. ............................ 395/708; 395/704; 395/709
[58] Field of Search .................................. 395/704, 708, 395/709, 183.14

[56] References Cited

U.S. PATENT DOCUMENTS 5,107,418  4/1992  Cramer et al. .......................... 395/700
5,615,369  3/1997  Holler .................................... 395/709

FOREIGN PATENT DOCUMENTS 0372-834 A3  11/1989  European Pat. Off. .......... G06F 9/45

OTHER PUBLICATIONS

"Efficient Implementation of Detection of Undefined Variables", Czech, Computer Journal, vol. 31, No. 6, 1988, pp. 545–549.

"Run–time detection of undefined Variables Considered Essential", Software Practice and Experience, vol. 20 (4), Apr. 1990, pp. 391–402.

SunSoft–Sun Microsystems, Inc., SPARCompiler Pascal, Version 3.0.3 for Solaris, Reference Manual (1994).

SunSoft–Sun Microsystems, Inc., SPARCompiler Pascal, Version 3.0.3 for Solaris, User's Guide (1994).

Primary Examiner—James P. Trammell
Assistant Examiner—Kakali Chaki
Attorney, Agent, or Firm—Graham & James LLP

[57]  ABSTRACT

A method and apparatus for checking for portions of record variables that are referenced before they are assigned a value. This checking occurs in the semantic checking portion of a compiler for a high level computer language. The present invention creates certain entries in a name list table (the symbol table) that point to two additional lists: the flist (fields list) and the clist (component list). The semantic analyzer refers to the name list table and to the clists and flists to determine whether a portion of a record variable has been assigned a value. If no value has been assigned to the portion of the record variable, the compiler prints an error message.

20 Claims, 17 Drawing Sheets

The structure of CLIST and FLIST used with -Rw option to keep track record fields usage after step {4} of example 1
(during execution of code being compiled)

- Rw data structures for simple Pascal example
  (FNL attribute omitted)

After example 2
(during execution of code being compiled)

-Rw data structures for Pascal example using WITH (FNL attribute omitted)

-Rw data structures for Pascal example with implicit assignments (FNL attribute omitted)

| | |
|---|---|
| The Pascal main program, r.p (record and array of records) | ```
program p;
procedure qq;
type compl = record re, im: integer end;
      arc = array [1..2] of compl;
var z: compl;
    a: arc;
begin
writeln(z.im);
writeln(a[1].re);
end;
begin
end.
``` |
| The commands to compile r.p and the -Rw warnings that are issued | ```
hostname% pc -Rw r.p
Fri Jan 27 17:35:50 1995  r.p:
w 18280, line 8: field z.im is used but never set
w 18280, line 9: field a[...].re is used but never set
``` |
| The Pascal main program, rr.p (two records) | ```
program p;
type r = record a,b: integer end;
procedure qq;
var r1, r2: r;
var i: integer;
begin
      i:=r1.a;
      i:=r2.a;
      i:=r1.b;
      i:=r2.b;
end;
begin
      qq;
end.
``` |

Fig. 12(a)

| | |
|---|---|
| The commands to compile rr.p and the -Rw warnings that are issued | hostname% pc -Rw rr.p<br>Mon Feb 20 14:59:04 1995 pas/rr.p:<br>w 18280, line 7: field r1.a is used but never set<br>w 18280, line 8: field r2.a is used but never set<br>w 18280, line 9: field r1.b is used but never set<br>w 18280, line 10: field r2.b is used but never set |
| The Pascal main program, recvar.p (variant record) | program p;<br>procedure qq;<br>type r = record<br>   x,y: integer;<br>        case integer of<br>        0:(a: integer);<br>        1: (b: char);<br>   end;<br>var v: r;<br>begin<br>  v.x:=1;<br>  writeln(v.y);<br>end;<br>begin<br>qq;<br>end. |
| The commands to compile recvar.p | hostname% pc -Rw recvar.p<br>Mon Feb 20 15:55:18 1995 recvar.p:<br>w 18280, line 12: field v.y is used but never set<br>hostname% a.out<br>                         0 |

Fig. 12(b)

The Pascal main program, with.p (with statement)

```
program p;
type C = record re, im: integer end;
     AC = array[1..2] of C;
     RC = record C1, C2: C end;
     PRC = ^RC;
procedure qq;
var
   c: C;
   ac: AC;
   rc: RC;
   prc: PRC;
begin
   ac[1] := c;
   with ac[1] do
   begin
     re:=1;
   writeln(im);
    end;
    with prc^.C1 do
    begin
      writeln(im);
    end;
end;
begin
qq;
end.
```

The commands to compile and execute with.p

```
hostname% pc -Rw with.p
Mon Feb 20 16:28:34 1995 with.p:
w 18280 line 17: field prc^.C1.im is used but never set
In procedure qq:
w 18280 variable c is used but never set
w 18280 variable rc is used but never set
hostname% a.out
          0

*** a.out terminated by signal 11: segmentation violation
*** Traceback being written to a .out.trace
Abort (core dumped)
```

Fig. 12(c)

METHOD AND APPARATUS FOR RECORD FIELDS USAGE CHECKING AT COMPILE TIME

RELATED APPLICATIONS

The following applications, which are filed concurrently herewith, are related to the subject application, and are expressly incorporated by reference.

1) application Ser. No. 08/586,234 of Vladimir O. Safonov entitled "Method and Apparatus for Efficient Evaluation of Semantic attributes in LALR Parsing."

2) application Ser. No. 08/586,805 of Vladimir O. Safonov entitled "Method and Apparatus for Compiler Symbol Table Organization With No Lookup in Semantic Analysis."

3) application Ser. No. 08/586,338 of Vladimir O. Safonov entitled "TIP Technology and Its Application to SPARCcompiler Pascal."

BACKGROUND OF THE INVENTION

This application relates to a compiler and, specifically to the design of a compiler that performs semantic checking for a high level computer programming language.

A compiler is a computer program that translates a "source program" written in a high level computer programming language that is easily understood by human beings into a "target program" executable by a computer. Typically, a compiler includes several functional parts. For example, a conventional compiler may include a lexical analyzer that looks at the source program and identifies successive "tokens" in the source program.

A conventional compiler also includes a parser/syntactical analyzer, which takes as an input a grammar defining the language being compiled and a series of actions associated with respective production of the grammar. The parser builds a "parse tree" for the statements in the source program in accordance with the grammar productions and actions. For each statement in the input source program, the parser generates a parse tree of the source input in a recursive, "bottom-up" manner in accordance with relevant productions and actions. Thus, the parse tree is formed of nodes corresponding to one or more grammar productions. Generation of the parse tree allows the parser to determine whether the parts of the source program comply with the grammar. If not, the parser generates an error. Thus, the parser performs syntactical checking, but does not conventionally check the meaning (the "semantics") of the source program. One example of a conventional parsing technique is a LALR (lookahead, left right) parser, which is described in Chapter 4 of the treatise "Compilers: Principles, Techniques and Tools" by Aho, Sethi, and Ullman, the entirety of which is hereby incorporated by reference.

In conventional compilers, after the source program is parsed, it is input to a semantic analyzer, which checks for semantic errors, such as the mismatching of types, etc. The semantic analyzer evaluates, for example, "semantic attributes" of nodes of the parse tree. After parsing and semantic analysis, the compiler generates intermediate code, optimizes the intermediate code and generates a target program.

Conventional compilers do not detect certain types of semantic errors in the computer programs that they are compiling. An example of such an error occurs in computer programs that reference portions of a record variable before that portion of the record variable has been assigned a value.

Such semantic errors are, of course detected when the compiled program is executed (i.e., at "run-time") because the compiled program performs incorrectly. Run-time errors, however, take an undesirable amount of time to detect. It is, therefore, desirable to detect such errors before run-time.

SUMMARY OF THE INVENTION

The present invention overcomes the problems and disadvantages of the prior art by checking for portions of record variables that are referenced before they are assigned a value. This checking preferably occurs in the semantic analyzer of the compiler.

The present invention creates certain entries in a name list table (the symbol table) that point to two additional lists: an flist (fields list) and a clist (component list). The semantic analyzer refers to the name list table and to the clists and flists to determine whether a portion of a record variable has been assigned a value before it is accessed. If no value has been assigned to the portion of the record variable, a warning message is printed by the compiler.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIGS. 12(a), 12(b), and 12(c) show examples of error messages output by a compiler for the pascal programming language in accordance with the present invention.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
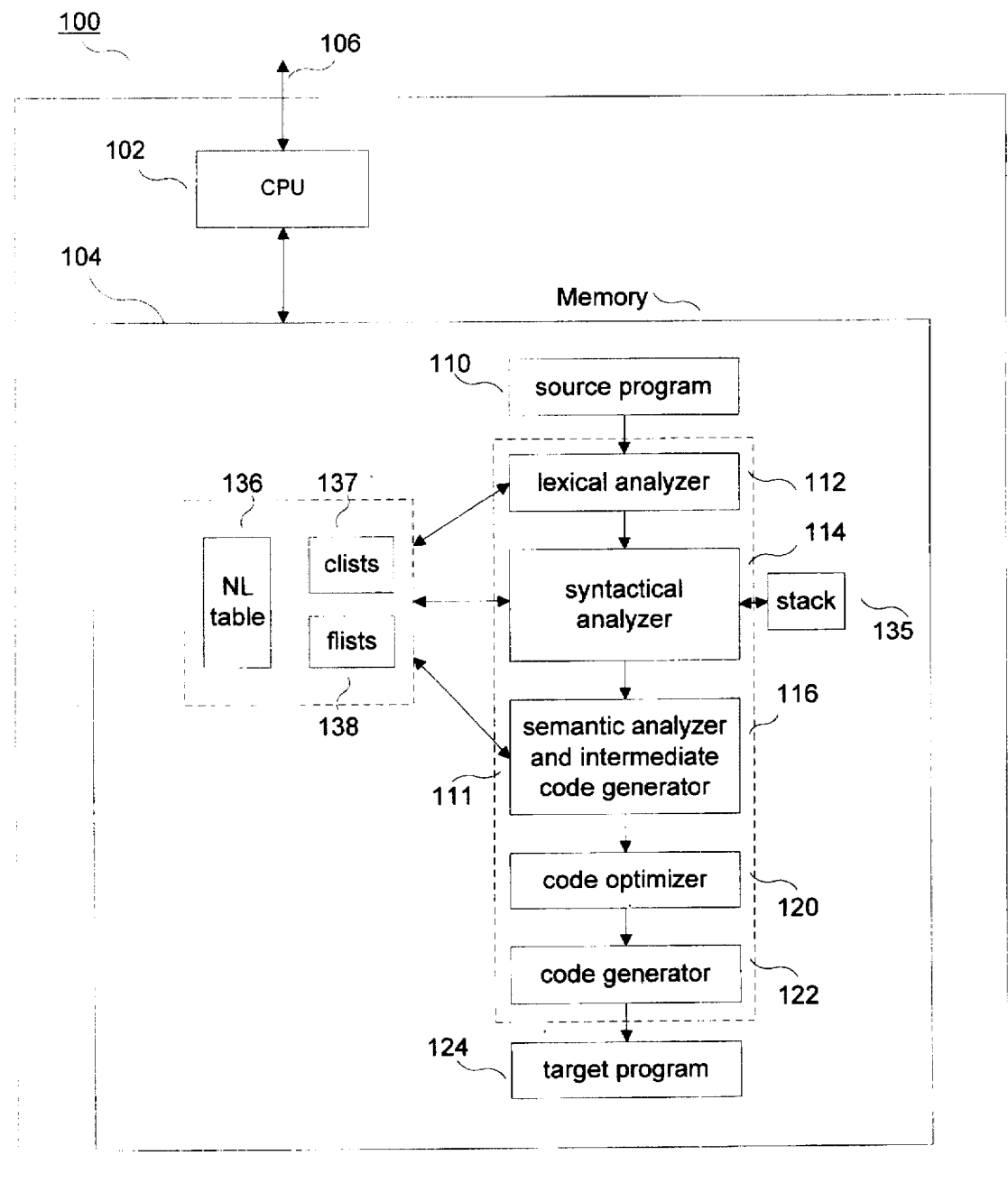
FIG. 1 is a block diagram of a computer system in accordance with a preferred embodiment of the present invention.

FIG. 1 is a block diagram of a computer system 100 in accordance with the present invention. Computer system 100 includes a CPU 102, a memory 104, and input/output lines 106. It will be understood by persons of ordinary skill in the art that computer system 100 can also include numerous elements not shown in the Figure for the sake of clarity, such as disk drives, keyboards, display devices, network connections, additional memory busses, additional CPUs, etc.

Memory 104 includes a source program 110, a compiler 111, and a target program 124. Compiler 111 includes a lexical analyzer 112, a syntactical analyzer 114, a semantic analyzer 116, a code optimizer 120 (optional), and a code generator 122. Compiler 111 inputs source program 110 and processes the source program to output target program 124. Compiler elements 112–116 operate for each statement in source program 110 to generate intermediate code. Memory 104 also includes a name list (NL) table 136 (also called a "symbol table"), at least one clist (component list) 137 and at least one flist (fields list) 138.

The elements of compiler 111 are embodied as instructions stored in memory 104 and performed by CPU 102. Syntactical analyzer 114 accesses a parser stack 135. Syntactical analyzer 114 uses a grammar which includes productions and associated actions corresponding to the productions.

Semantic analyzer 116 traverses a parse tree created by syntactical analyzer 114, calling appropriate semantic analysis routines. Semantic analyzer 116 prints error messages and/or halts execution if semantic errors are found. If no semantic errors are found, semantic analyzer 116 outputs PCC trees in a manner known to persons of ordinary skill in the art. Intermediate code generator 116 translates the PCC trees into a front-end representation in a manner known to persons of ordinary skill in the art (e.g., Aho et al., "Compilers, Principles, Techniques and Tools," pp. 735–737). Code optimizer 120 (optional) optimizes this representation and outputs the front-representation in optimized form (for example, unused code fragments may be deleted). Code generator 122 preferably translates the front-end representation into target program 124 in a manner known to persons of ordinary skill in the art.

A preferred embodiment of the present invention is the SPARCpascal compiler for the pascal programming language. The compiler itself is preferably written in the C programming language and executes under the Solaris operating system, which is available from Sun Microsystems and which is related to the Unix operating system. Solaris is a trademark of Sun Microsystems. The SPARC trademarks are trademarks of SPARC International, Inc. Unix is a registered trademark in the United States and other countries, exclusively licensed through X/Open Company, Ltd.

Record variables are known to persons familiar with various types of high level programming languages, such as pascal, C, and recent versions of Fortran, such as Fortran 77 and Fortran 90. Record variables are described, for example, in the SPARCcompiler Pascal Reference Manual, version 3.0, 1994, pages 26–33, which is available from Sun Microsystems, and which is herein expressly incorporated by reference. Although the invention is described in relation to the pascal programming language, it should be understood that the present invention is not limited to compilers for the pascal programming language and can be used in compilers for other appropriate high level programming languages.

In a preferred embodiment of the present invention, a compiler allows the user to indicate whether or not the compiler should check for assignments to undefined record variables. In this embodiment, if a command line switch "Rw" (Record Warning) is present, the compiler will perform such a check in accordance with the description below. If the switch is not present, no check is performed. The present invention performs a check only for locally declared record variables. In general, it is not possible to determine at compile-time whether a globally declared record variable has been assigned a value or not because the value may be assigned to it in a separately compiled module.

As will be understood by persons of ordinary skill in the art, lexical analyzer 112 and syntactical analyzer 114 place symbols into NL table 136 during syntactic analysis. In the present invention, semantic analyzer 116 adds additional information into NL table 136 and adds entries to clist 137 and flist 138. As described below, these additional data structures enable semantic analyzer 116 to determine when a computer program uses record variables before they are assigned a value.

Figure 2:
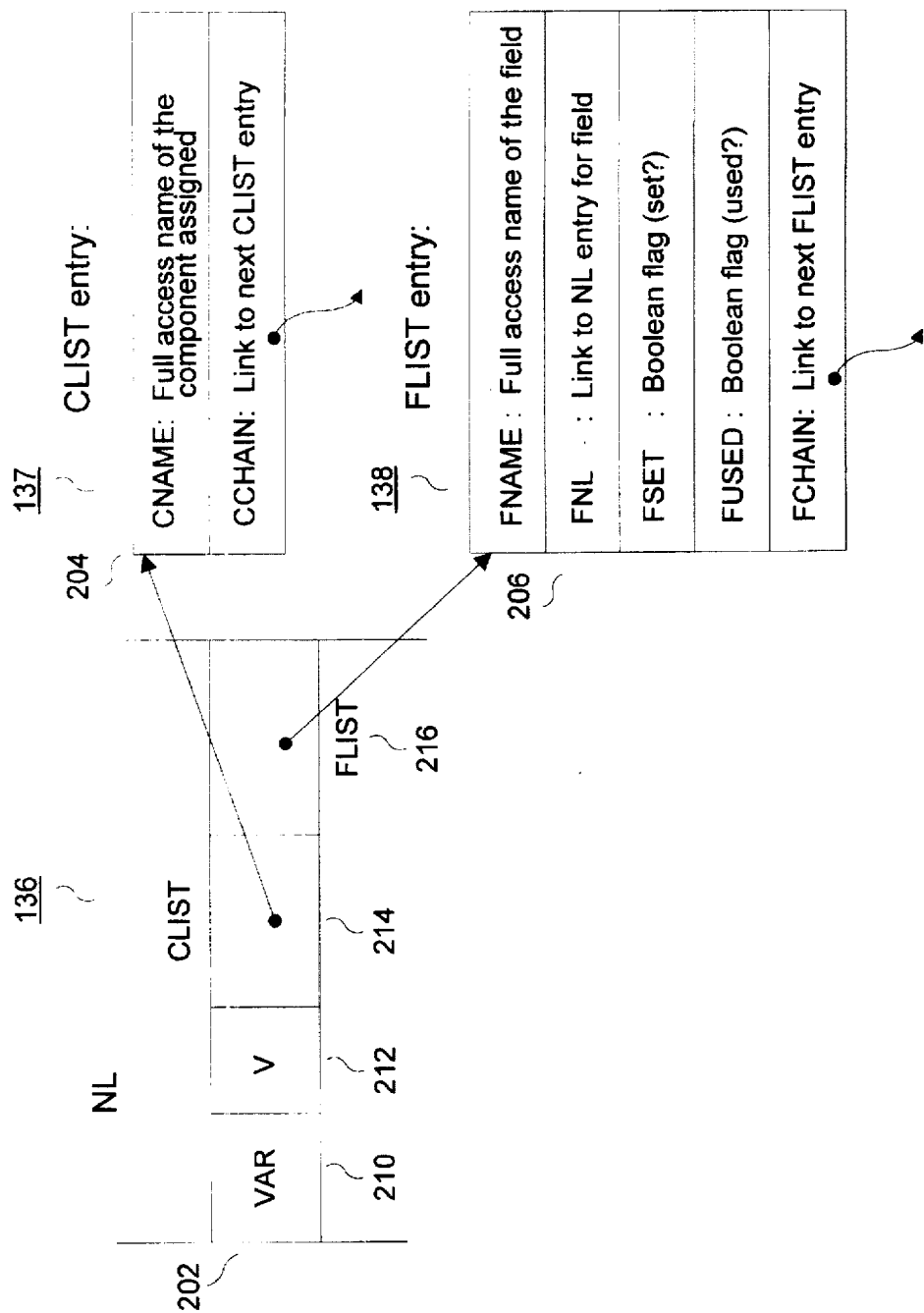
FIG. 2 shows a format of a name list table of FIG. 1 and a format of respective entries in an flist data structure and a clist data structure of FIG. 1.

FIG. 2 shows a format of NL table 136 and a format of respective entries in flist 137 and clist 138. After the format of these data structures is discussed, several examples will be given in which the semantic analyzer stores data in the data structures and uses the data to determine whether record variables are being used before they are assigned values.

In FIG. 2, a name list entry 202 includes the class of the symbol 210 (e.g., "VAR," LABEL, etc.), a symbol name 212, a pointer 214 to a clist entry 204, and a pointer 216 to an flist entry 206. An ASSIGNED flag (not shown) also included in an NL table entry is discussed below. Clist entry 204 includes a CNAME, which is a full access name of a record component and a CCHAIN pointer that points to the next entry in clist 137. Flist entry 206 includes an FNAME, which is a full access name of a record variable; an FNL field, which contains a pointer to a NL table entry for the field; an FSET field, which is a flag indicating whether the record variable has been assigned a value; an FUSED field, which is a flag indicating whether the record variable has been accessed or used; and an FCHAIN pointer that points to the next entry in flist 138.

The following paragraphs describe a first example in accordance with the present invention. The example relates to the following computer program, which is written in the pascal programming language:

```
    program p;
    procedure q;
    type    R    =    record a, b: integer end;
            RR   =    record c: R; d: integer end;
    var     V:   R;
            VV:  RR:
    begin
            V.a := 0; {*}
            writeln(V.a); {1}
            writeln(V.b); {2}
            VV.c := V; {**}
            writeln(VV.c.a); {3}
            writeln(VV.d); {4}
    end;
    begin
            q;
    end.
```

Here, usage {1} and {3} are correct. Usage {3} is correct because VV.c is assigned prior, hence VV.c.a. is also considered to be assigned. Usage {2} and {4} are bugs because values of V.b and VV.d are undefined.

Figure 3:
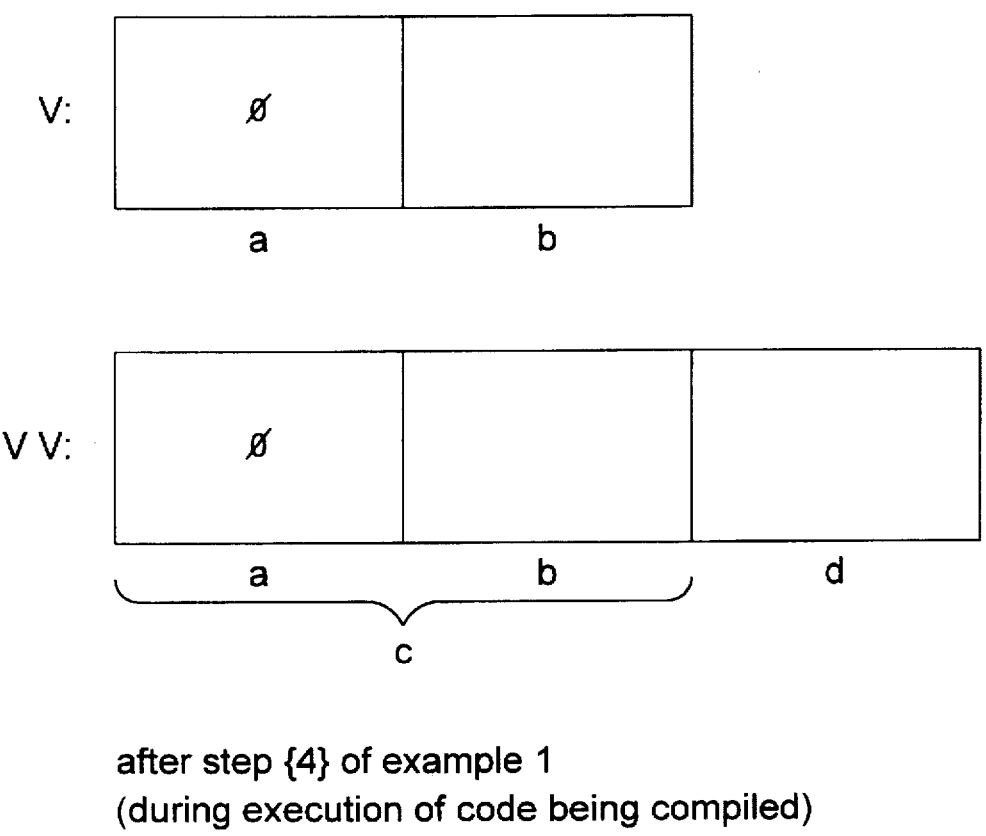
FIG. 3 shows a first example of the values that would be stored in record variables if a computer program containing unassigned record variables were to be executed.

FIG. 3 shows a first example of the values that would be stored in record variables if computer program p containing unassigned record variables were to be executed. Note that record variables V.b and VV.d would be unassigned. Therefore, statements {2} and {4} should generate warnings in a compiler in accordance with the present invention.

Figure 4A:
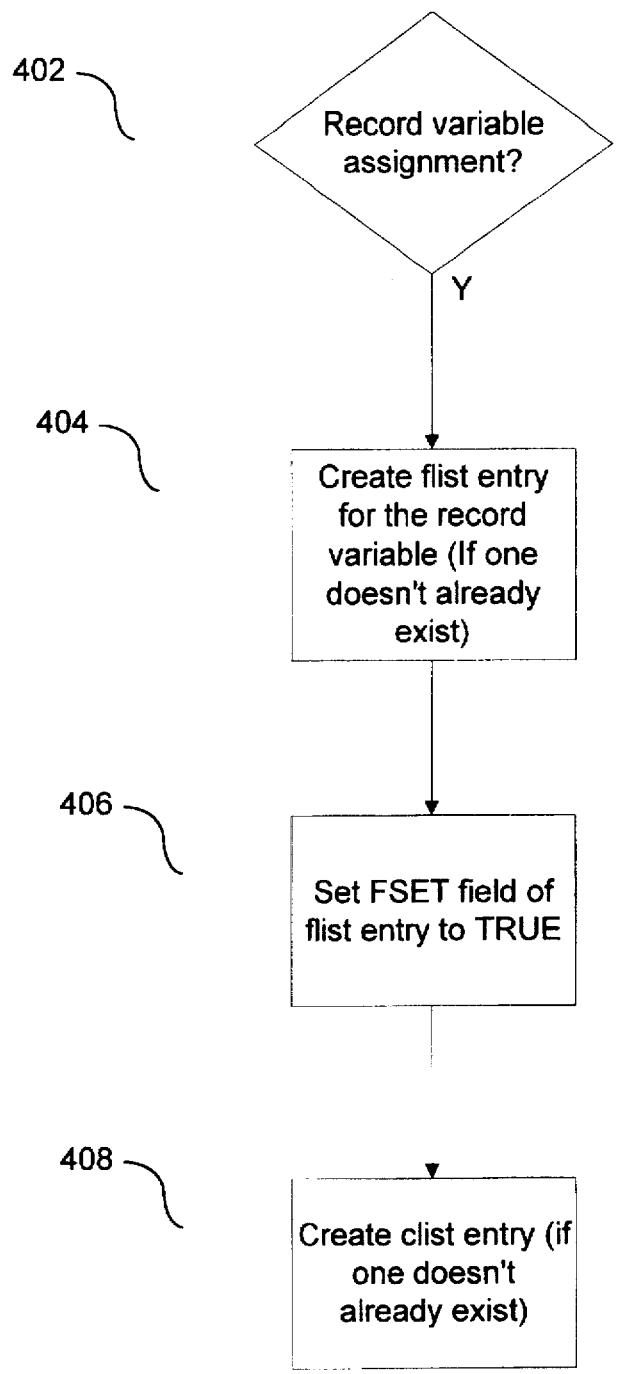
FIG. 4(a) is a flow chart showing steps performed by the semantic analyzer of FIG. 1 to detect assignment of a value to a record variable.

FIG. 4(a) is a flow chart showing steps performed by the semantic analyzer of FIG. 1 to detect source code that assigns a value to a record variable. The steps of FIG. 4(a) also create and fill the NL table and the clist and flist data structures. In step 402 the semantic analyzer determines whether it has encountered a program statement in which a record variable is assigned a value. If so, in step 404, the semantic analyzer creates an flist entry in the flist for the record variable (e.g., entry 502 of FIG. 5) (assuming that an entry does not already exist). The flag fields FSET and FUSED are set to FALSE when the entry is created. The FSET field is set to TRUE in step 406. The FNL field is set to an NL entry for the name. In step 408, a clist entry is created and added to the clist for the record variable (assuming that an entry does not already exist) (e.g., entry 504).

Figure 4B:
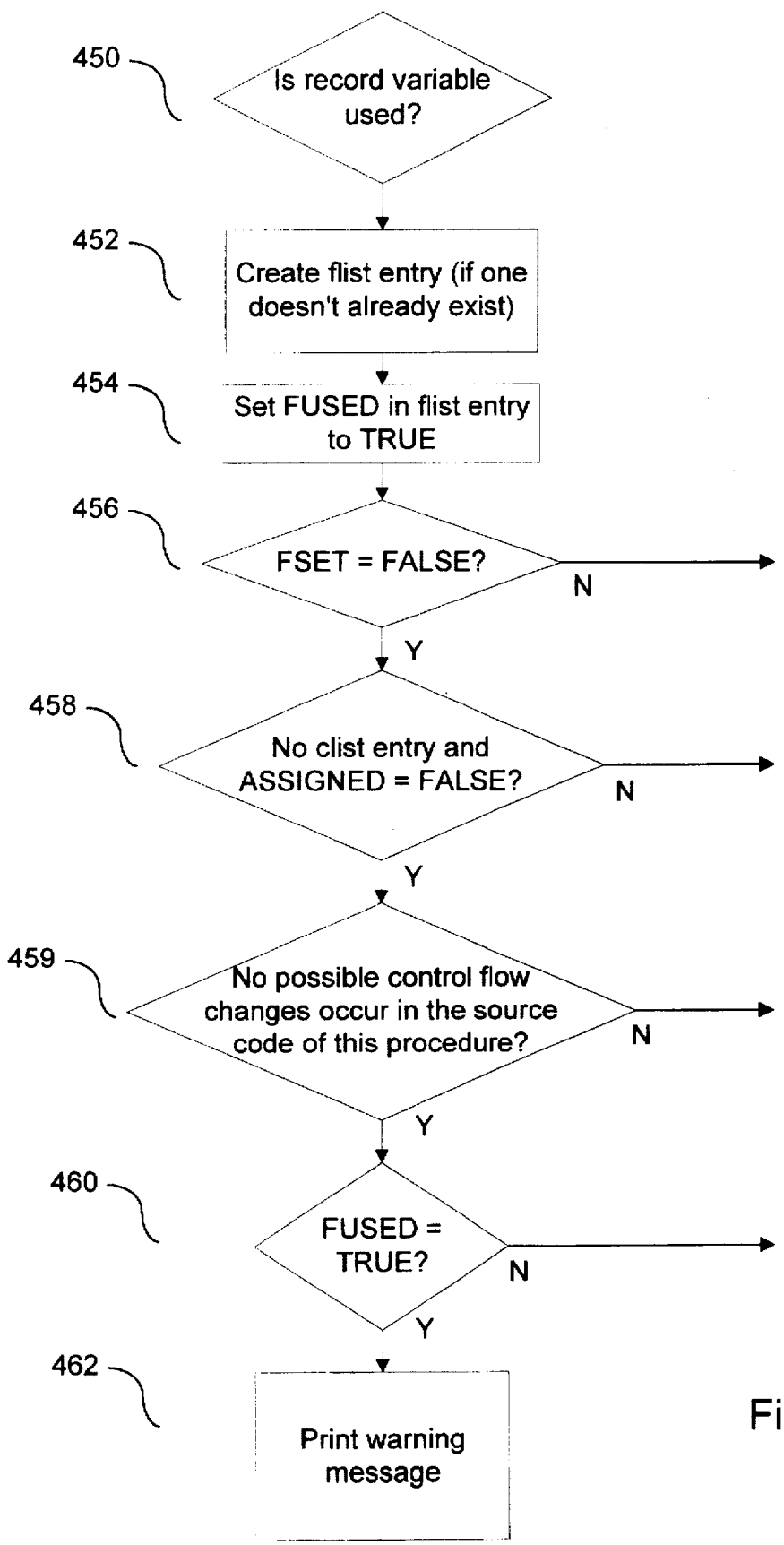
FIG. 4(b) is a flow chart showing steps performed by the semantic analyzer of FIG. 1 to detect usage of record variables before they are assigned a value.

FIG. 4(b) is a flow chart showing steps performed by the semantic analyzer of FIG. 1 to detect usage of record variables before they are assigned a value. In step 450 the semantic analyzer determines whether it has encountered a program statement in which a record variable is being used (as opposed to being assigned a value). If so, in step 452, the program analyzer creates an flist entry in the flist for the record variable (e.g., entry 506) (assuming that one does not already exist). The flag fields FSET and FUSED are set to FALSE when the entry is created. The FUSED field is set to TRUE in step 454. The FNL field is set to an NL entry for the name. No clist entry is created.

Steps 456–462 determine whether usage of the record variable should cause a warning flag. If the FSET flag is FALSE in step 456, control passes to step 458. If, in step 458, there is no corresponding clist entry (and any corresponding "ASSIGNED" flag in NL table 136 are FALSE, as discussed below), then control passes to step 459. If, in step 459, there were no control flow changes in the current procedure (i.e., no GOTO statements or procedure calls) up to the point of this record variable usage, then control passes to step 460. If control reaches this point, the record variable has not been assigned a value. If, in step 460, the FUSED flag is TRUE (which it always will be in this flow chart), then the record variable has been used without being assigned and the semantic analyzer prints a warning message.

Note that step 459 is necessary to ensure that the compiler reports a warning only when there are no possible control flow changes (i.e., gotos or procedure calls) from the start of the current routine until the current point of record field usage. Otherwise, the assignment may actually be executed before the usage, and the warning may be obsolete. For example, the source code may contain the following:

```
goto M;
K:
writeln(V.a); {1}
M:
V.a:=1; {2}
goto K;
```

Note that {1} occurs prior to {2} but is executed after {2}. To avoid such cases, the compiler keeps track of whether gotos/procedure calls have occurred in the current routine. If so, warnings are not generated at once. If needed (i.e., if there was no assignments to the corresponding record fields in the whole routine body), they are generated at the end of the routine. The idea is to report warnings as soon as possible, but only if it makes sense to do so.

Figure 5:
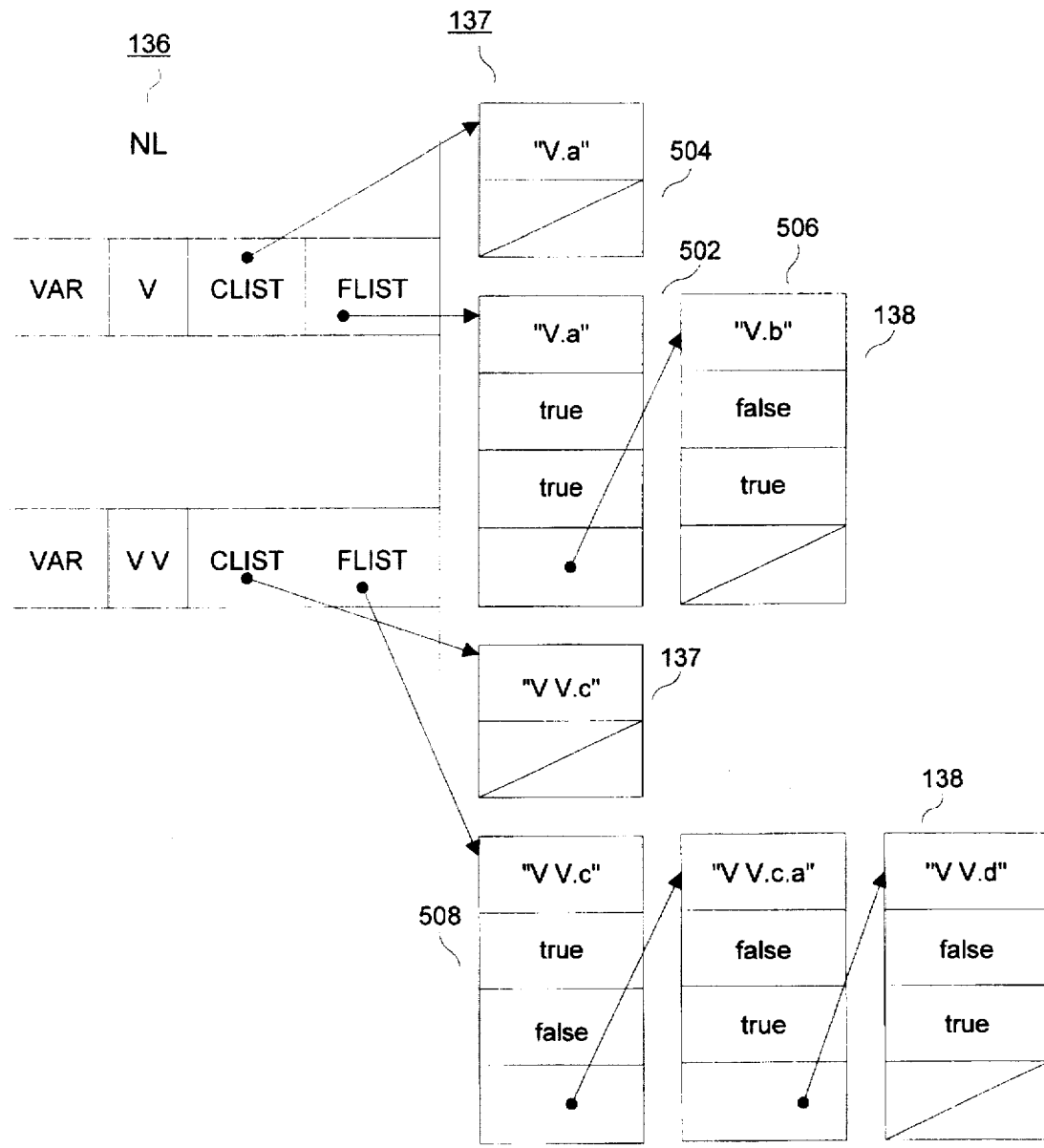
FIG. 5 shows values in the name list table and in the flist and clist data structures in accordance with the first example.

FIG. 5 shows values in name list table 136 and in flist 137 and clist 138 in accordance with the first example. Semantic analyzer 116 puts these values into NL table 136 as it traverses the parse tree and checks the values in data structures 136, 137, and 138 as described below whenever it encounters a use of a record variable to determine whether the record variables has been assigned a value in the program thus far.

In FIG. 5, two local variables V and VV are defined. At each of the points {1}–{4} of program p, the compiler creates new flist entries for the fields used. More exactly, a V.a flist entry 502 is created at the point {*}, and at the point {1} it is found in flist (V) and marked as "used". At {**}, a new flist (VV) entry 508 for VV.c is also created. Thus, at the points {*} and {**}, clist (V) and clist (VV) entries are created for V.a and VV.c.

On creating/updating flist entries at {1}–{4}, the compiler determines whether each usage is appropriate.

{1} V.a is marked as "set" and "used". This is OK

{2} V.b is marked as "used" but not as "set"; its prefix is not found in clist(V), so a warning is issued. Field V.b is used but never set.

{**} VV.c is marked as set. This is OK (no matter that it's not marked as "used").

{3} VV.c.a is marked as "used" but not as "set". Nevertheless its prefix VV.c (determined from the FNAME field) is found in the clist(VV). Hence, there is no bug.

{4} VV.d is marked as "used" but not marked as "set." Therefore, the warning is issued. Field VV.d is used but never set.

The following paragraphs describe a second example in accordance with the present invention. The example relates to the following computer program, which is written in the pascal programming language:

```
program p2;
procedure q;
        type complex = record re, im: real end;
        var Z: complex;
```

```
            begin
                with Z do {1}
                begin
                    re := 0.0; {2}
                    writeln(im); {3}
                end;
                writeln (Z.re); {4}
            end; {q}
    begin
            q;
    end.
```

Figure 6:
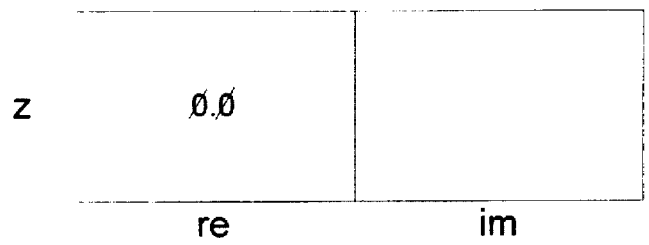
FIG. 6 shows a second example of the values that would be stored in a record variable if a computer program containing unassigned record variables within a "with" statement were to be executed.

FIG. 6 shows a second example of the values that would be stored in record variables if a computer program containing unassigned record variables in a "with" statement were to be executed. Note that record variable z.im would be unassigned and should generate warnings in a compiler in accordance with the present invention.

Figure 7:
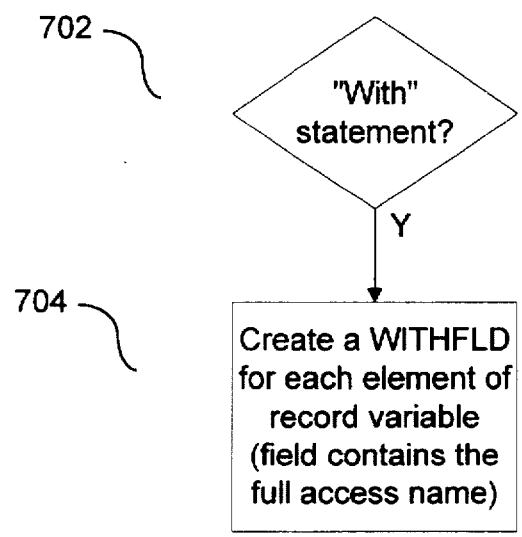
FIG. 7 is a flow chart showing steps performed by the semantic analyzer of FIG. 1 when it detects a "with" statement.
Figure 8:
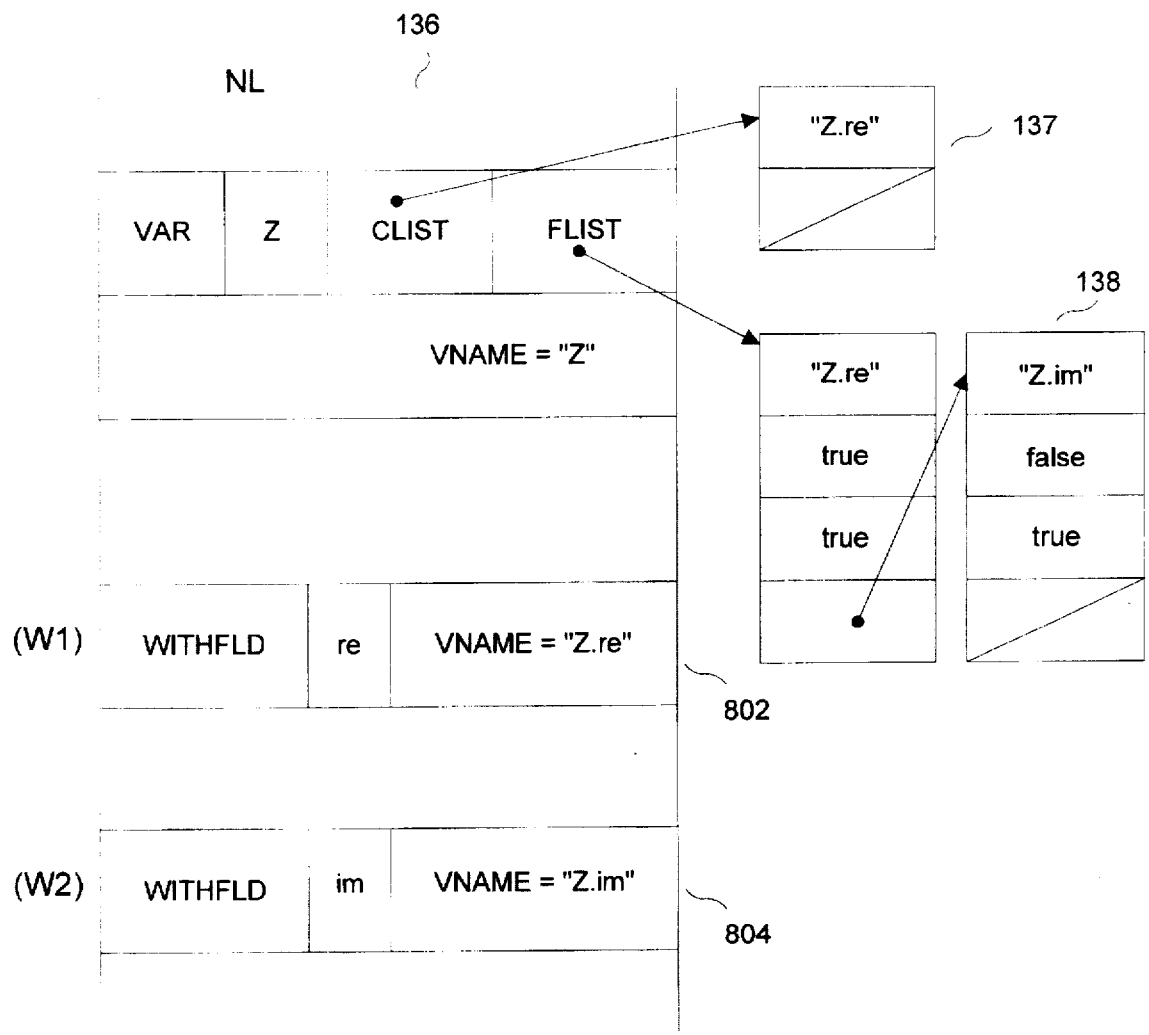
FIG. 8 shows values in the name list table and in the flist and clist data structures in accordance with the second example.

FIG. 7 is a flow chart showing steps performed by the semantic analyzer of FIG. 1 when a "with" statement is encountered. The steps of FIG. 4(a) are also performed whenever a record variable is encountered. The steps of FIG. 7(a) create additional entries in the NL table. In step 702 the semantic analyzer determines whether it has encountered a "with" program statement. If so, in step 704, the program analyzer creates an NL table entry (e.g., entries 802 and 804 of FIG. 8) for each field of the record type (assuming that such entries do not already exist). A WITHFLD entry has a "vname" field into which the full field access name is stored. As shown in FIG. 8, the vname field contains the full access name of the field (e.g., vname field 804).

The steps of FIG. 4(b) are performed whenever it is detected that a record variable is being used and a warning is printed if needed.

FIG. 8 shows values in the name list table, and in the flist and clist data structures in accordance with the second example. Two new NL entries, W1 and W2, are created for with fields (WITHFLD re and WITHFLD im).

At points {2} and {3}, new flist entries are created for "re" and "im" usage. Their full access names "Z.re" and "Z.im" are taken from "vname" of their NL entries. At point {3}, a warning on Z.im is issued because it is marked as "used" but not marked as "set", and has no assigned prefix in clist(Z).

At the point {4}, the flist entry for Z.re is updated to mark this field as "used". No warning issued because it is also marked as "set".

The following paragraphs describe a third example in accordance with the present invention. The example relates to the following computer program, which is written in the pascal programming language:

```
        program p3;
        procedure q;
        type    R    =    record a, b: integer end;
                AR   =    array [1..2] of R;
                PAR  =    ^ AR;
                FR   =    file of R;
        var     V: R;
                A: AR;
                P: PAR;
                F: FR;
        begin
                new (P); {1}
                reset (F); {2}
                V := F^; {3}
                A[1] := V; {4}
                writeln(V.a); {5}
```

```
                writeln(A[1].b); {6}
                writeln (F^.a); {7}
                writeln(P^[2].b); {8}
                close(F);
        end; {q}
        begin
                q;
        end.
```

Figure 9:
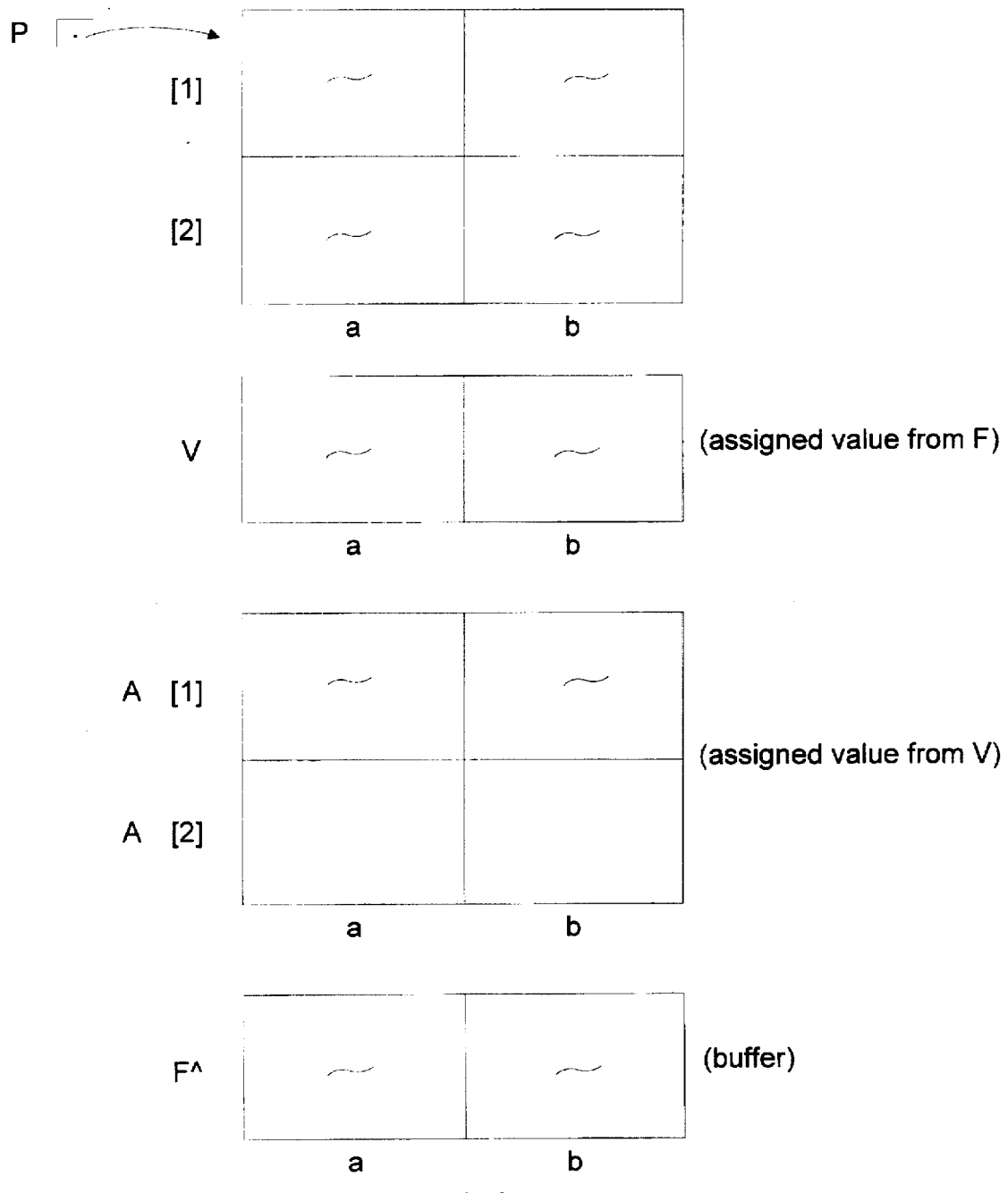
FIG. 9 shows a third example of the values that would be stored in record variables if a computer program containing implicit assignment of record variables were to be executed.

FIG. 9 shows a third example of the values that would be stored in record variables if the above computer program containing implicit assignment of record variables were to be executed. Note that each record variable used has previously been assigned so no error will be generated.

Figure 10A:
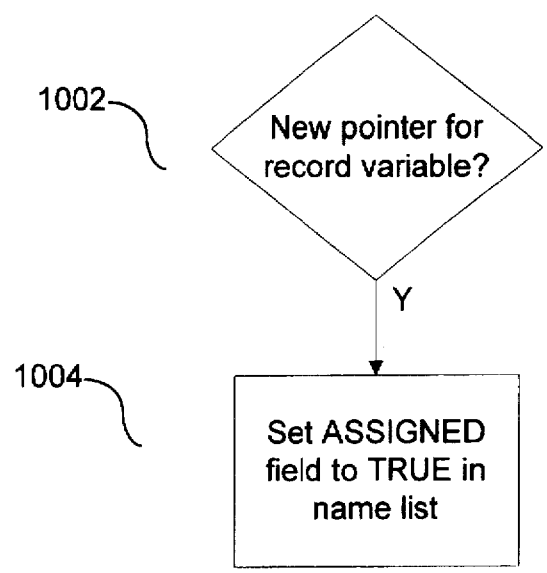
FIGS. 10(a) through 10(f) are flow charts showing steps performed by the semantic analyzer of FIG. 1 to detect using implicit assignments to record variables.
Figure 10B:
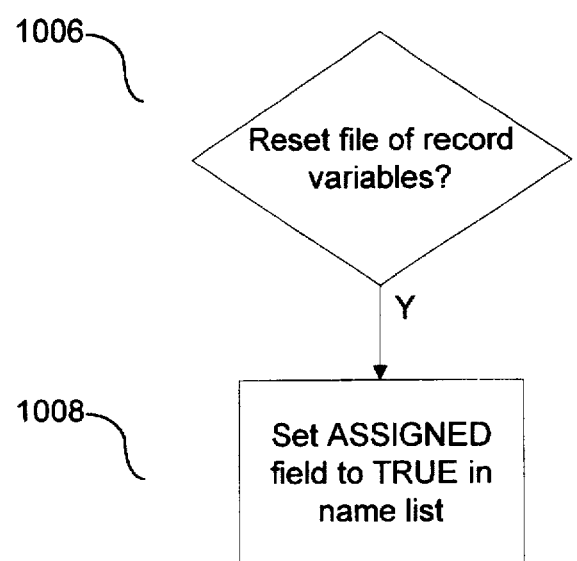

FIG. 10(a) is a flow chart showing steps performed by the semantic analyzer of FIG. 1 when a "new" statement initiating a pointer to a record variable is encountered. The steps of FIGS. 10(a) through 10(f) set an "ASSIGNED" flag in various entries of the NL table to TRUE when, e.g., entire record variables are assigned. In steps 1002 and 1004, when the semantic analyzer determines that it has encountered an initiation of a new pointer to a record variable, it sets an ASSIGNED flag 1102 of the pointer variable's NL table entry field to TRUE to indicate that the pointer has been assigned a value. In steps 1006 and 1008, when the semantic analyzer determines that it has encountered a "reset" of a file of record variables, it sets an ASSIGNED flag 1104 in an NL table entry field to TRUE to indicate that the file buffer has been assigned a value.

Figure 10C:
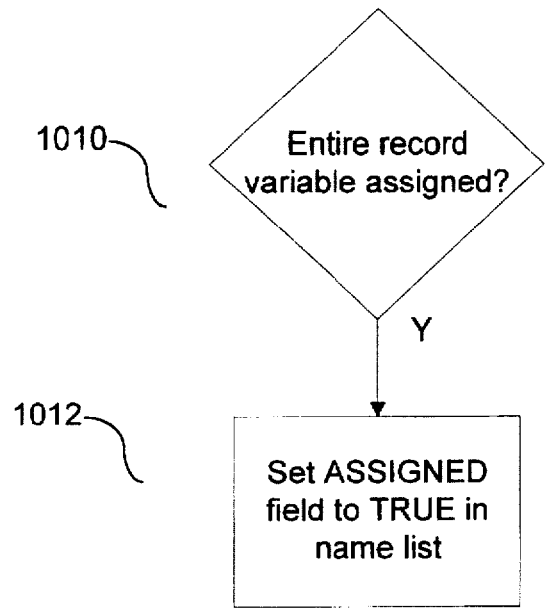

In steps 1010 and 1012 of FIG. 10(c), when the semantic analyzer determines that it has encountered an explicit assignment of an entire record variable, it sets ASSIGNED flag 1106 in an NL table entry to TRUE to indicate that the entire record variable has been assigned a value.

Figure 10D:
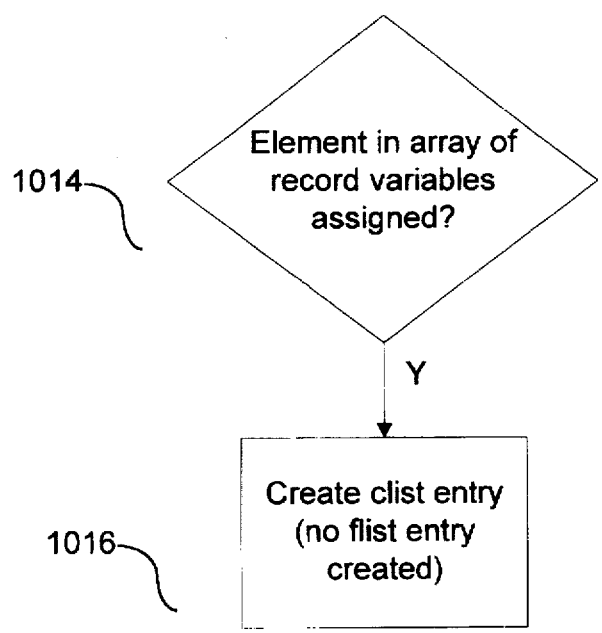

In steps 1014 and 1016 of FIG. 10(d), when the semantic analyzer determines that it has encountered an assignment to an element in an array of record variables, it creates a clist entry (e.g., entry 1108) to indicate that the entire array element has been assigned a value.

Figure 10E:
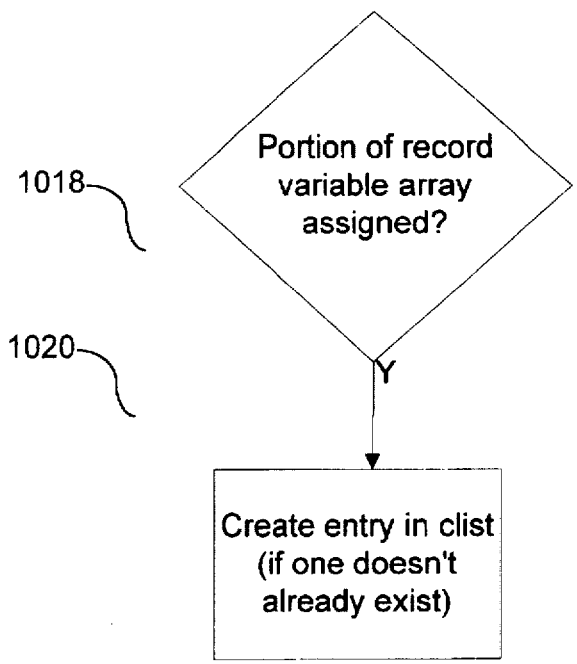

In steps 1018 and 1020 of FIG. 10(e), when the semantic analyzer determines that it has encountered an assignment of portion of an element in an array of record variables, it creates a flist entry (e.g., entry 1110) to indicate that a portion of the array element has been assigned a value.

Figure 10F:
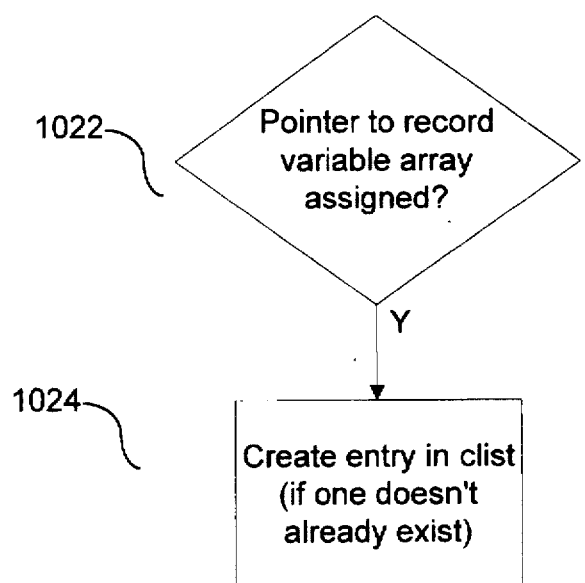

In steps 1022 and 1024 of FIG. 10(f), when the semantic analyzer determines that it has encountered an indirect assignment to a record variable, it creates a flist entry (e.g., entry 1112) to indicate that the record variable has been assigned a value.

Whenever the semantic analyzer detects that a record variable is being used the steps of FIG. 4(b) are performed and a warning is printed if needed.

Figure 11:
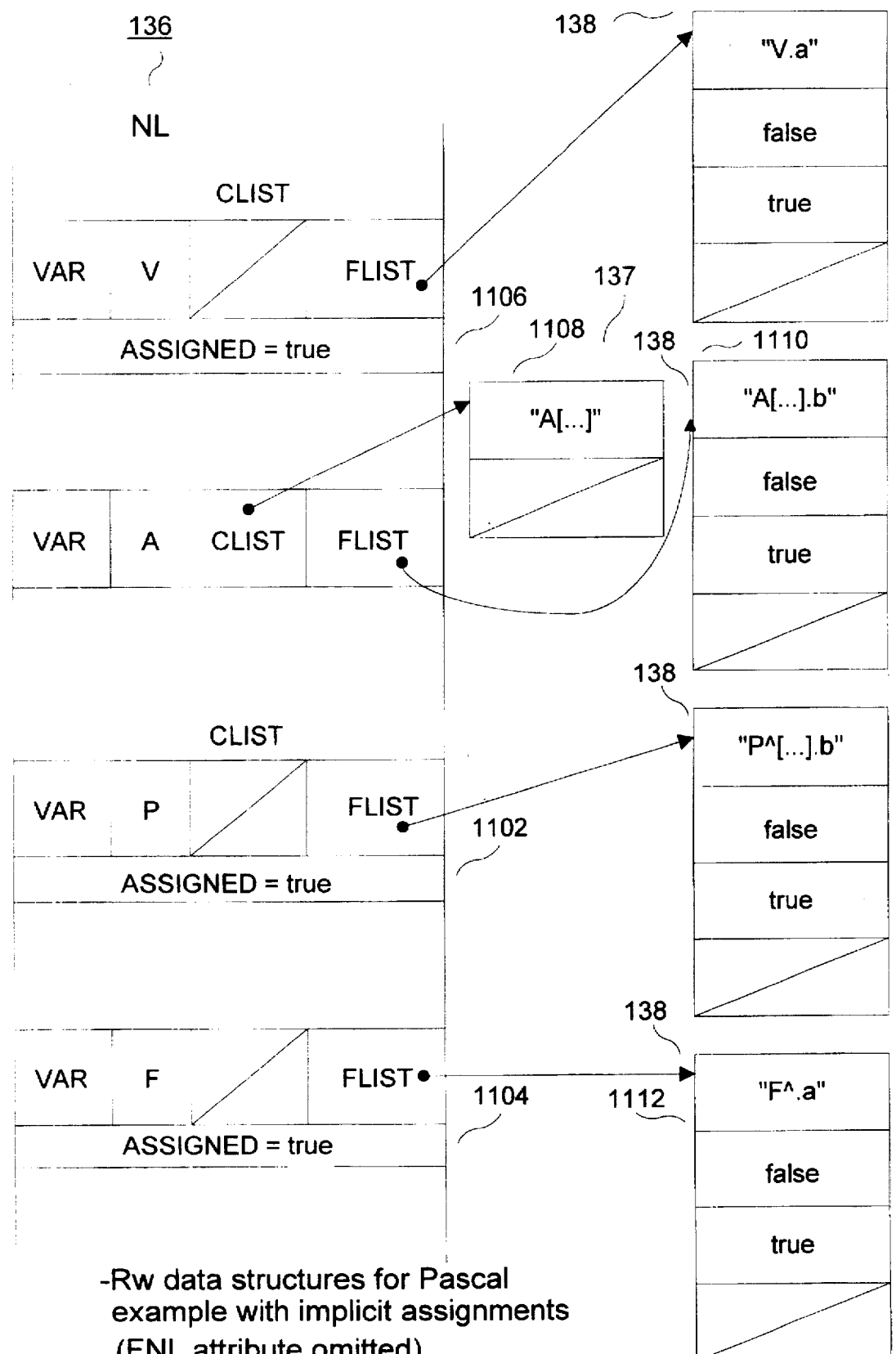
FIG. 11 shows values in the name list table and in the flist and clist data structures in accordance with the third example.

FIG. 11 shows values in the name list table, and in the flist and clist data structures in accordance with the third example.

{1} P is implicitly initialized by standard procedure "new" which allocates a dynamic variable and assigns its pointer to P. The whole variable P is marked as "assigned" in its NL entry via an ASSIGNED flag 1106. Hence, any of its component field will be considered to be assigned. No warning is printed.

{2} The standard procedure reset (F) implicitly assigns to the buffer variable F^ of the file F. Hence, F is also marked as "assigned" in ASSIGNED flag 1104, with the same effect as P. No warning is issued.

{3} Record variable V is assigned explicitly. It is marked as "assigned" in ASSIGNED flag 1106. No warning is issued. (Note that in a preferred embodiment, whole variables are not recorded into clists and that flists are created only for record fields).

{4} Array selector A[1] is assigned. Its full access name is transformed into a "generalized" form of A[ ... ] and the corresponding clist(A) entry is created. No warning is issued.

{5} V.a usage is not a bug because V is marked as "assigned". No warning is issued.

{6} A[1].b usage is not a bug. Its access name is transformed into a "generalized" form of a[ ... ].b and added to flist(A). On adding, the compiler checks if there is a prefix of this field access in the clist(A). A[ ... ] is found in the clist(A). No warning is issued.

{7} F^.a usage is not a bug because F is marked as "assigned" in ASSIGNED flag 1104. No warning is issued.

{8} P^[2].b usage (transformed into: P^[ ... ].b) is not a bug because P is marked as "assigned" in ASSIGNED flag 1102.

No warning is issued.

FIGS. 12(a), 12(b), and 12(c) show examples of error messages output by a compiler for the pascal programming language in accordance with the present invention. They conform to the examples given above and will not be described in detail herein.

In summary, during compilation of a computer program, the present invention keeps track of which records and portions of records have been assigned a value. When a record variable is used, if it has not previously been assigned a value (either explicitly or implicitly) the present invention prints a warning message.

Other embodiments of the present invention will be apparent to those skilled in the art from consideration of the specification and practice of the invention disclosed herein. For example, the record fields usage checking mechanism of the present invention can be used in any compiler for a language which has a construct similar to a record (e.g., COBOL, C, C++, Fortran 77, etc.). It is intended that the specification and examples be considered as exemplary only, with a true scope of the invention being indicated by the following claims.

What is claimed is:

1. A method for detecting, in a source computer program stored in a memory, when record variables are used before they are assigned, the method comprising the steps, performed by a data processing system, of:

inputting the source program, the source program including at least a first source line;

providing a data structure stored in the memory to indicate which components of which record variables have had values assigned to them;

determining, in accordance with the data structure, whether the first source line contains a use of one or more components of a record variable, said record variable called a used record variable;

checking, when the first source line contains a used record variable, whether the data structure indicates that the one or more components of the used record variable has been assigned a value; and printing an error message when the used record variable has not been assigned a value.

2. The method of claim 1, wherein the source program includes a second source line prior to the first source line and wherein the providing step includes the steps of:

determining if the second source line contains an assignment of a value to a record variable, said record variable called an assigned record variable; and entering information in the data structure stored in the memory to indicate that a value has been assigned to the assigned record variable.

3. The method of claim 1, wherein the providing step includes the step of providing the data structure which includes a Name List (NL) table that holds the names and attributes of symbols used in the source program.

4. The method of claim 1, wherein the data structure includes:

a fields list (flist) that includes the names of record variables; and a components list (clist) that includes the names of record components.

5. The method of 1, wherein the providing step includes the step of providing the data structure which includes a Name List (NL) table that holds the names and attributes of symbols used in the source program, the NL table including an ASSIGNED field that indicates when a symbol has an assigned value.

6. The method of claim 1, wherein the used record variable is located within a "with" statement and the data structure includes an NL table having a WITHFLD entry for each field in the record variable specified in the "with" statement.

7. The method of claim 1, wherein the determining step includes the step of determining, in accordance with the data structure, whether the first source line contains a use of a record variable that is a pointer to a record variable.

8. The method of claim 1, wherein the determining step includes the step of determining, in accordance with the data structure, whether the first source line contains a use of a record variable that represents a file of record variables.

9. The method of claim 1, wherein the determining step includes the step of determining, in accordance with the data structure, whether the first source line contains a use of a record variable that represents an element in an array of record variables.

10. The method of claim 1, wherein the determining step includes the step of determining, in accordance with the data structure, whether the first source line contains a use of a record variable that represents a portion of an element in an array of record variables.

11. A compiler for detecting in a source computer program when record variables are used before they are assigned, the source program having a first source line, the compiler comprising:

a memory storing a data structure that indicates which record variables have had values assigned to them, the data structure including a predetermined parameter;

a determiner circuit provided to determine, in accordance with the data structure, whether the first source line contains a use of a record variable, said record variable called a used record variable;

a checker provided to determine, when the first source line contains a used record variable, whether the predetermined parameter in the data structure indicates that the used record variable has been assigned a value; and a printing circuit provided to print an error message when the used record variable has not been assigned a value.

12. The compiler of claim 11, wherein the source program includes a second source line prior to the first source line and further including:

a determiner provided to determine whether the second source line contains an assignment of a value to a record variable, said record variable called an assigned record variable; and a data storing circuit provided to enter information in the data structure stored in the memory to indicate that a value has been assigned to the assigned record variable.

13. The compiler of claim 11, wherein the data structure includes a Name List (NL) table that holds the names and attributes of symbols used in the source program.

14. The compiler of claim 11, wherein the data structure includes:

a fields list (flist) that includes the names of record variables; and a components list (clist) that includes the names of record components.

15. The compiler of claim 13, wherein the NL table includes an ASSIGNED field that indicates when a symbol has an assigned value.

16. The compiler of claim 13, wherein the used record variable is located within a "with" statement and the data structure includes an NL table having a WITHFLD entry for each field in the record variable specified in the "with" statement.

17. The compiler of claim 11, wherein the used record variable is a pointer to a record variable.

18. The compiler of claim 11, wherein the used record variable represents a file of record variables.

19. The compiler of claim 11, wherein the used record variable represents an element in an array of record variables.

20. The compiler of claim 11, wherein the used record variable represents a portion of an element in an array of record variables.

* * * * *

UNITED STATES PATENT AND TRADEMARK OFFICE
CERTIFICATE OF CORRECTION

PATENT NO. : 5,758,163

DATED : May 26, 1998

INVENTOR(S): Safonov

It is certified that error appears in the above-identified patent and that said Letters Patent is hereby corrected as shown below:

Column 1, line 13, should read--Ser.No.08/585,805--instead of "Ser. No. 08/586,805".

Signed and Sealed this

Twenty-ninth Day of December, 1998

Attest:

BRUCE LEHMAN

Attesting Officer     Commissioner of Patents and Trademarks